INVENTORS
ANDREW GABOR,
ELEUTHERE POUMAKIS &
JOHN A. ALTONJI
BY
Lane, Aitken, Dunner & Ziems
ATTORNEYS

INVENTORS
ANDREW GABOR
ELEUTHERE POUMAKIS &
JOHN A. ALTONJI

BY Lane, Aitken, Dunner & Ziems
ATTORNEYS

Aug. 4, 1970 A. GABOR ET AL 3,522,594

MAGNETIC STORAGE SYSTEM WITH AUTOMATIC LATERAL LOADING OF A CARTRIDGE CONTAINING AN ENDLESS TAPE

Filed Sept. 29, 1966 10 Sheets-Sheet 3

INVENTORS
ANDREW GABOR
ELEUTHERE POUMAKIS &
JOHN A. ALTONJI

BY
Lane, Aitken, Dunner & Ziems
ATTORNEYS

INVENTORS
ANDREW GABOR
ELEUTHERE POUMAKIS &
JOHN A. ALTONJI

BY Lane, Aitken, Dunner & Ziems
ATTORNEYS

Aug. 4, 1970 A. GABOR ET AL 3,522,594

MAGNETIC STORAGE SYSTEM WITH AUTOMATIC LATERAL LOADING OF A CARTRIDGE CONTAINING AN ENDLESS TAPE

Filed Sept. 29, 1966 10 Sheets-Sheet 5

INVENTORS
ANDREW GABOR,
ELEUTHERE POUMAKIS &
JOHN A. ALTONJI

BY Lane, Aitken, Dunner & Ziems
ATTORNEYS

INVENTORS
ANDREW GABOR
ELEUTHERE POUMAKIS &
JOHN A. ALTONJI
BY Lane, Aitken, Dunner & Ziems
ATTORNEYS INVENTORS
ANDREW GABOR
ELEUTHERE POUMAKIS &
JOHN A. ALTONJI
BY
Lane, Aitken, Dunner & Ziems
ATTORNEYS INVENTORS
ANDREW GABOR
ELEUTHERE POUMAKIS &
JOHN A. ALTONJI
BY Lane, Aitken, Dunner & Ziems
ATTORNEYS

INVENTORS
ANDREW GABOR
ELEUTHERE POUMAKIS &
JOHN A. ALTONJI

BY Lane, Aitken, Dunner & Ziems
ATTORNEYS

Aug. 4, 1970 A. GABOR ET AL 3,522,594

MAGNETIC STORAGE SYSTEM WITH AUTOMATIC LATERAL LOADING OF A CARTRIDGE CONTAINING AN ENDLESS TAPE

Filed Sept. 29, 1966 10 Sheets-Sheet 10

INVENTORS
ANDREW GABOR
ELEUTHERE POUMAKIS &
JOHN A. ALTONJI

BY
Lane, Aitken, Dunner & Ziems
ATTORNEYS

United States Patent Office 3,522,594
Patented Aug. 4, 1970

3,522,594
MAGNETIC STORAGE SYSTEM WITH AUTOMATIC LATERAL LOADING OF A CARTRIDGE CONTAINING AN ENDLESS TAPE

Andrew Gabor, Lincoln, Mass., Eleuthere Poumakis, Danville, Calif., and John A. Altonji, Syosset, N.Y., assignors to Potter Instrument Company, Inc., Plainview, N.Y., a corporation of New York Filed Sept. 29, 1966, Ser. No. 582,908
Int. Cl. G11b *15/66, 23/06*
U.S. Cl. 340—174.1 8 Claims

ABSTRACT OF THE DISCLOSURE

In a magnetic storage system information is stored on endless belts of magnetic tape which are supported in interchangeable cartridges. The cartridges are automatically loaded for transducing operations over drive blocks by means of a feed screw. The speed of rotation of the feed screw is automatically changed to a low speed as the cartridge nears the position at which the transducing operations are to be carried out. Then while the cartridges are still moving into position, low suction is applied to the capstan which drives the endless belts in order to pick up slack in the endless belts. When the air pressure applied to the air bearings over which the belts are to be driven reaches a selected value, the motor driving the capstan is automatically energized. Then after a delay vacuum pumps are energized to operate at full speed to apply a full vacuum to the capstan.

This invention relates to magnetic storage and more particularly to an automatic cartridge loading and unloading system in a random access memory.

In the copending application entitled, Random Access Memory, Ser. No. 535,747, there is disclosed a random access magnetic storage system in which information is stored on endless belts of magnetic tape. The belts are supported in cartridges which are interchangeably mounted for transducing operations over drive blocks of the system. The present invention is concerned particularly with means for providing automatic loading and unloading of the cartridges over the drive blocks.

As disclosed in the above-mentioned copending application, the cartridges are mounted over the drive blocks by means of a feed screw. The cartridges are placed on the feed screw, which is then rotated to bring the cartridges over the drive blocks into position for transducing operations. In accordance with the present invention, the speed of rotation of the feed screw is automatically changed to low speed before the cartridges get into position so as to slow the approach of the cartridges. Then, while the cartridges are still moving into position, vacuum pumps, which are used to draw the tapes onto the capstan, are energized to run at low speed. The resulting low suction picks up slack in the endless belts caused by mechanical deflection of the supports of the endless belts in the cartridges as the cartridges come into position. Then, as soon as the cartridges are in position, the motor driving the feed screw is automatically deenergized and a blower is automatically energized. The blower supplies air to the air bearings over which the endless belts are to be driven. When the air pressure supplied to the air bearings reaches the desired level, the motor driving the capstan, which drives the endless belts, is automatically energized so that the capstan starts to rotate. After a delay, the vacuum pumps are energized to operate at full speed and apply full vacuum to the capstans so as to draw the tapes tightly against the capstan. As a result, the capstan will drive the tapes over the now fully pressurized air bearings. Following another delay to allow for the endless belts to reach full speed, a signal lamp is energized to indicate that the system is ready for transducing operations to be performed on the endless belts mounted in the cartridges.

Accordingly, an object of the present invention is to provide automatic loading of cartridges containing endless belts of magnetic t ape in a magnetic storage system.

Another object of the present invention is to facilitate the loading of cartridges containing endless belts of magnetic tape in a magnetic storage system.

A further object of the present invention is to provide an automatic sequence of operations which facilitate the loading of cartridges containing endless belts of magnetic tape for transducing operations in a magnetic storage system.

Further objects and advantages of the present invention will become readily apparent as the following detailed description of the present invention unfolds and when taken in conjunction with the drawings wherein.

Figure 1:
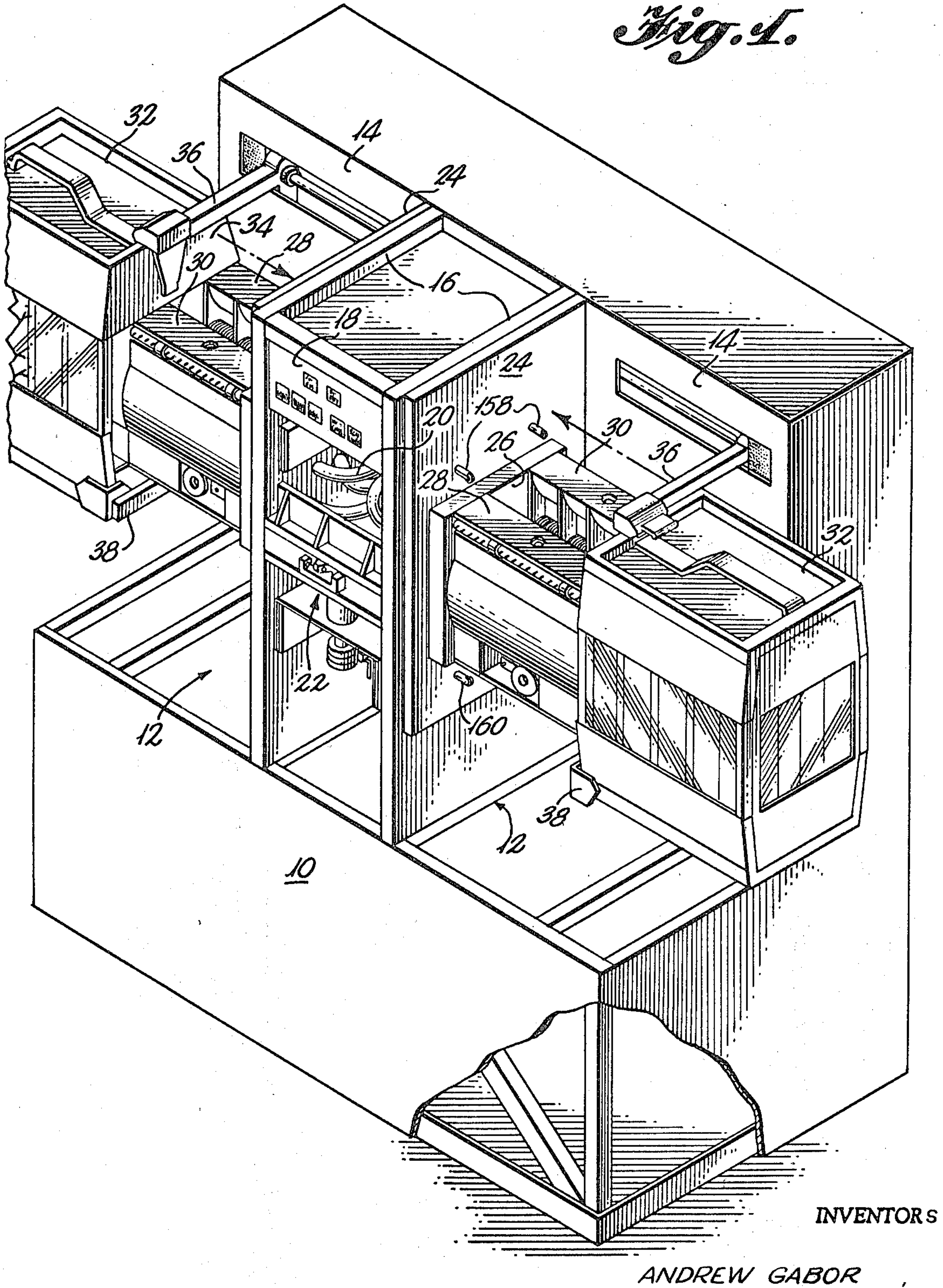
FIG. 1 is a perspective view of the information storage apparatus of this invention.
Figure 2:
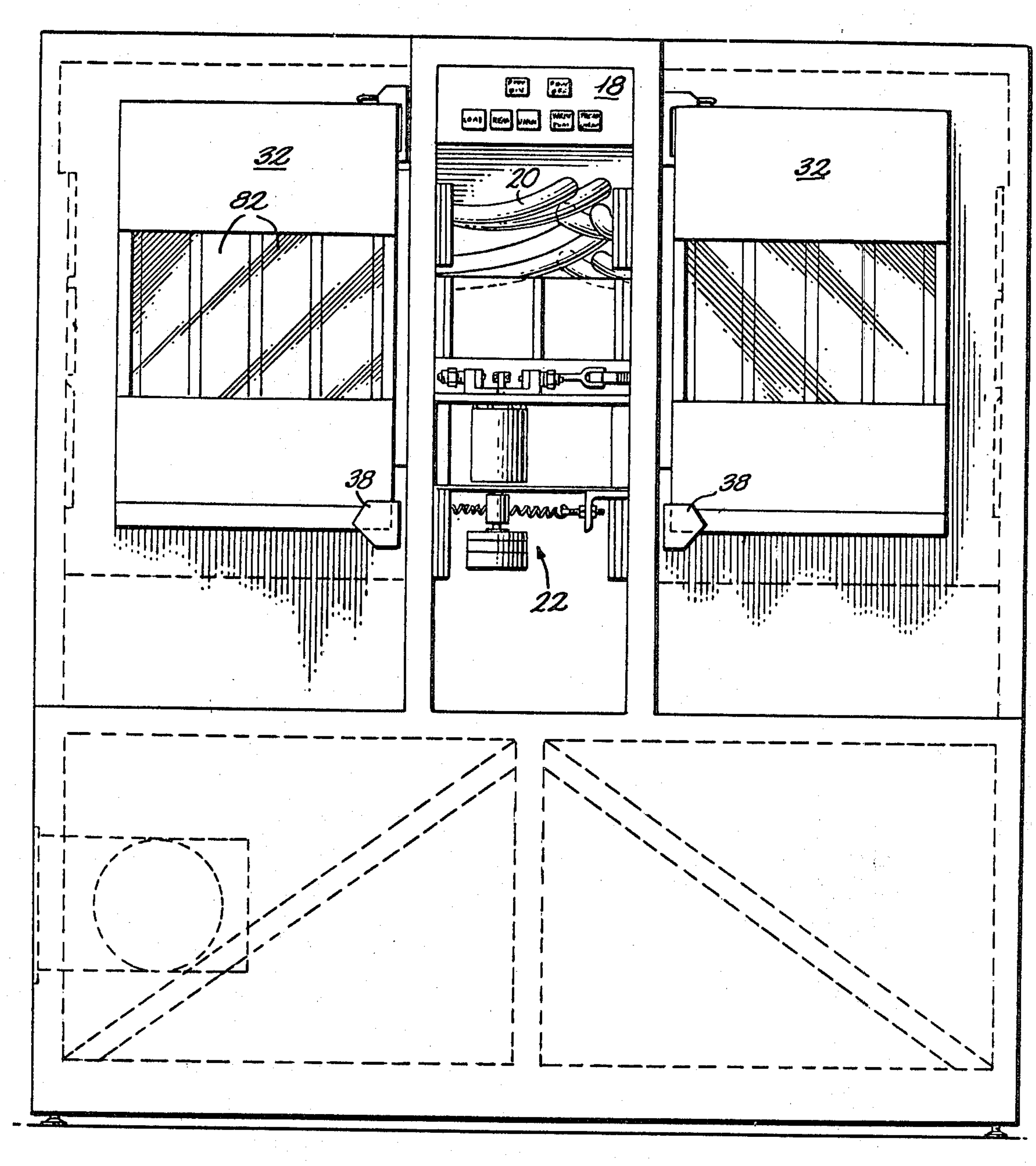
FIG. 2 is a front elevation of the storage apparatus illustrated in FIG. 1.

As shown in the drawings, and particularly FIGS. 1 and 2 thereof, the random access memory apparatus of this invention includes generally a frame or chassis 10 having a pair of cartridge receiving, transducing bays 12, each defined by rear walls or panels 14 and forwardly extending side walls 16 spaced to receive a control panel 18, air lines 20 and a head positioning assembly designated generally by the reference numeral 22. The bays 12 and the transducing apparatus positioned in each of the bays are identical. Each bay, therefore, includes an apron 24 in the form of a rectangular plate to which is fixed a drive block mounting plate 26 for removably supporting a pair of drive blocks 28 and 30. A pair of tape cartridges 32 each having an opening in its front wall 34 are adapted to be supported by upper and lower arms 36 and 38, respectively, of a cartridge feed assembly illustrated most clearly in FIG. 9 of the drawings, and carried simultaneously to an operative transducing position (see FIGS. 2, 4 and 5, for example) on the drive blocks 28 and 30.

Figure 4:
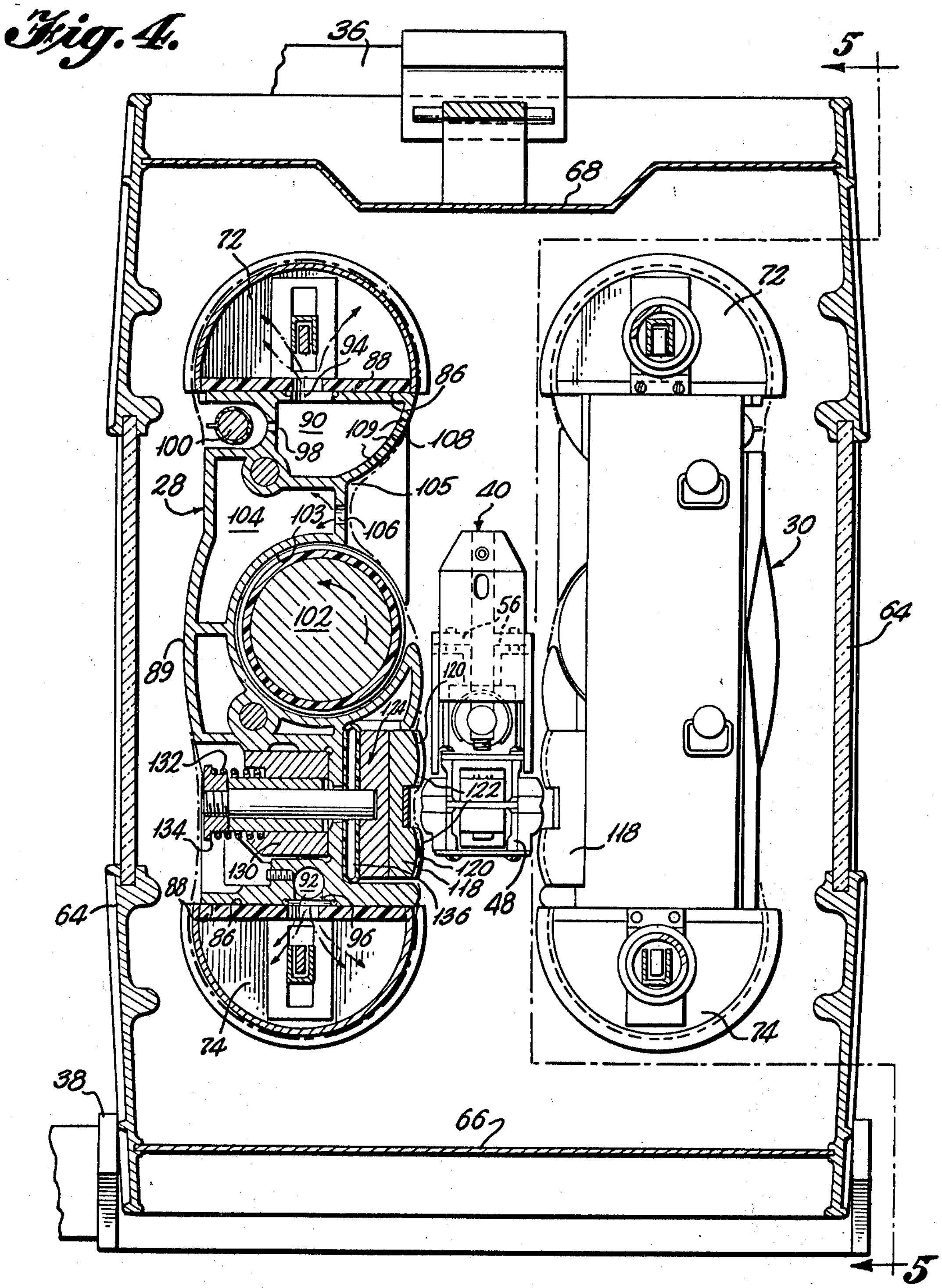
FIG. 4 is a fragmentary cross section illustrating the multitape cartridge for the storage apparatus of this invention in position for transducing operations.
Figure 5:
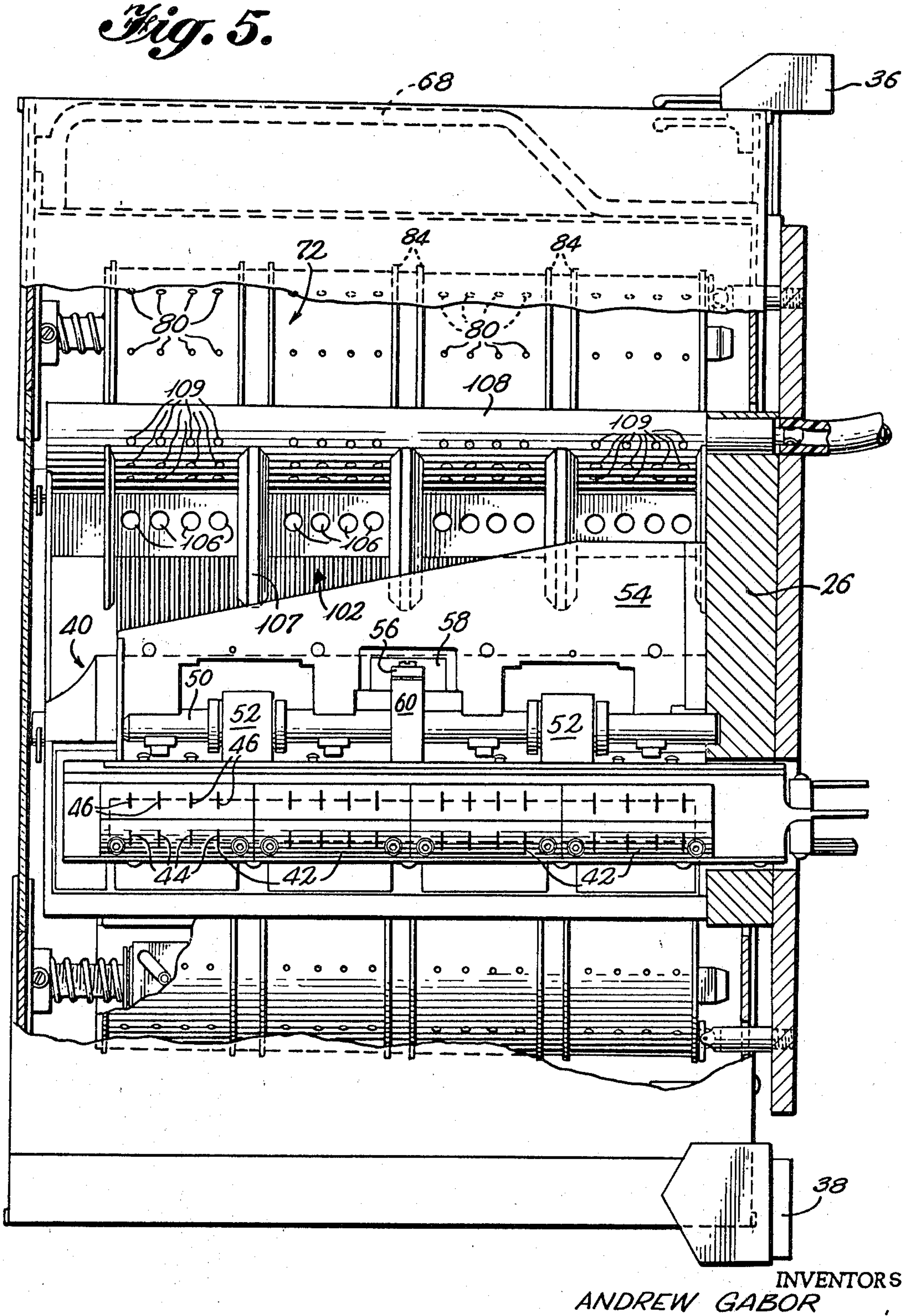
FIG. 5 is a fragmentary side elevation in partial cross section taken on line 5—5 of FIG. 4.
Figure 6:
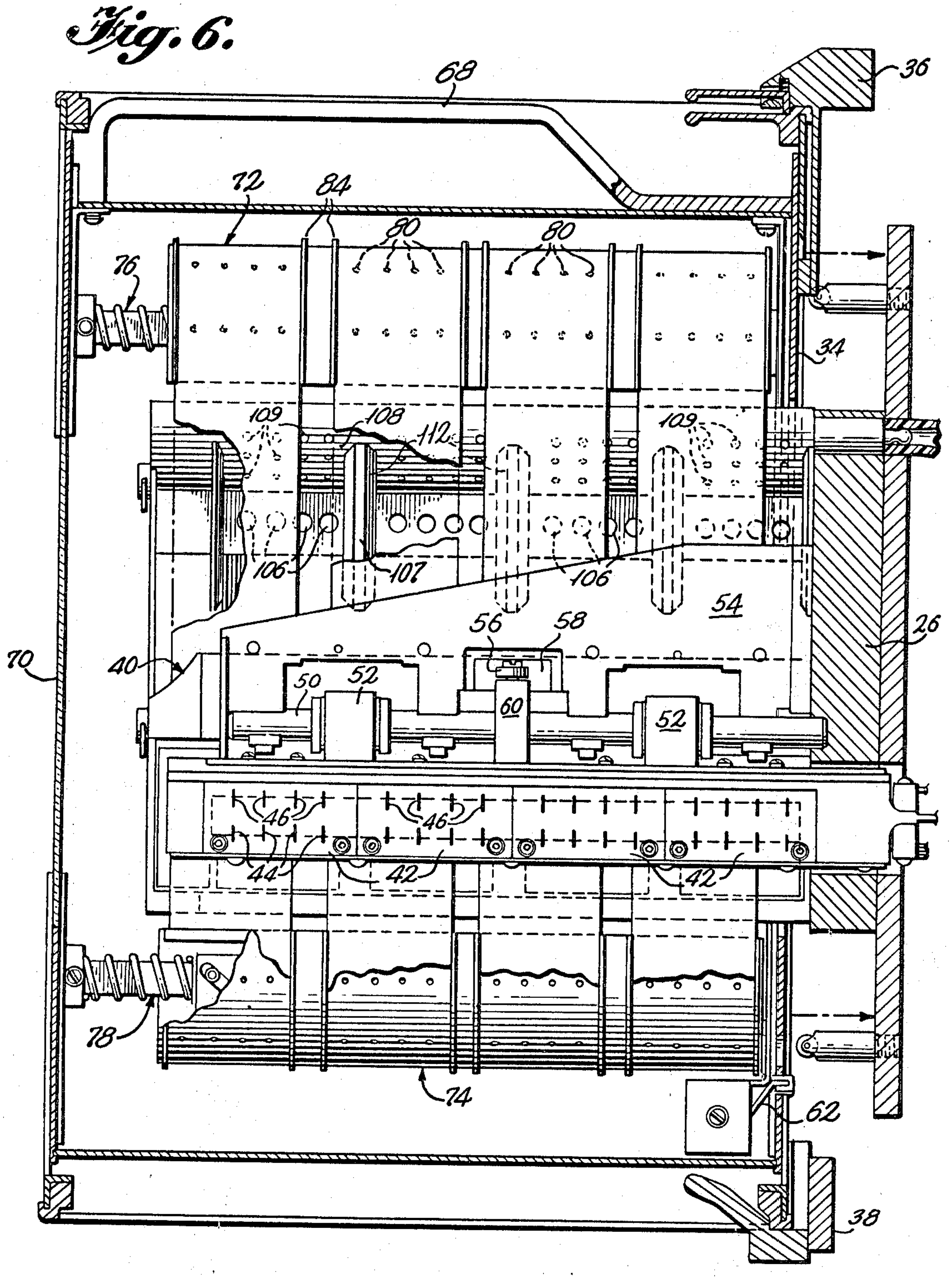
FIG. 6 is a cross section of the cartridge similar to FIG. 5 but illustrating the components thereof in the position assumed relative to the tape drive and transducing head assembly during cartridge loading.

Centrally positioned between the drive blocks 28 and 30 is a selectively positionable transducing head assembly generally designated by the reference numeral 40 in FIGS. 4–6. The head assembly for each transducing bay, in the embodiment shown, includes eight transducing head modules 42, four on each side thereof and facing in opposite directions, each of the modules 42 including four write heads 44 and four read heads 46. As shown in FIG. 4, the head modules 42 are supported on an H-beam 48, which in turn is supported for rectilinear movement on a bar 50 by linear bearings 52, the bar 50 forming part of a head supporting bracket 54 fixed to the mounting plate 26 of each transducing bay 12. Stabilization of the H-beam 48 and thus of the modules 42 about the axis of the bar 50 is provided by a pair of rollers 56 engaging opposite sides of an undercut flat portion 58 provided on each side of the bracket 54, the rollers 56 being journaled on a bracket 60 fixed to the upper edge of the H-beam 48.

The cartridges 32 are identical and interchangeable with others of such cartridges to provide an ultimate storage capacity limited only by the number of cartridges available. The cartridges 32 each comprise a closed receptacle having, in addition to the front wall 34 provided with an opening adapted to be closed by a curtain 62 (see FIG. 6), side walls 64, a bottom wall 66, a top wall 68 and a rear wall 70. A handle 72 is fixed to the top wall 68 and arranged under the upper margin established by the front, side and rear walls as shown in FIG. 4 to facilitate stacking. Positioned in each of the cartridges 32 are two sets of upper and lower turn-arounds 72 and 74, respectively.

Turn-arounds 72 and 74 are supported on rod assemblies 76 and 78 cantilevered from the rear wall 70 of the cartridge, and which include means, to be described in more detail below, for positioning the turn-arounds properly relative to the drive blocks 28 and 30 and the transducer head assembly 40. Each of the turn-arounds are hollow and generally semi-cylindrical in shape. A series of apertures 80, provide an air support for each of four magnetic tape loops 82 appropriately spaced by spacing members 84 suitably fixed to the cylindrical surface of the turn-arounds.

As shown in FIG. 4 of the drawings, mutually facing flat or planar surfaces 86 on the turn-arounds 72 and 74 are adapted to seat against similar flat or planar surfaces 88 at the top and the bottom of each of the drive blocks 28 and 30. To provide a continuous path through which the tapes 82 may be driven relative to the transducing head modules 42 during operation, the drive blocks are shaped to define a series of smooth, merging, curvilinear surfaces as shown in FIG. 4. These surfaces include an arcuate portion 89 to provide stable tape flight characteristics during transducing operations. Also, it will be noted that each of the drive blocks is provided with internal chambers or passages by which air may be directed against or withdrawn from the tape loops 82. Specifically, each of the drive blocks includes an upper air chamber 90 and a lower air passage 92 communicating through apertures 94 and 96, respectively, with complementing apertures opening through the flat surfaces 86 in the turn-arounds 72 and 74. Thus, it will be appreciated that air pressure fed to the chamber 90 and the passage 92 will be directed into the turn-arounds 72 and 74 and pass through the apertures 80 in the circumferential surfaces thereof to support the tape loops 82 on an air cushion. The chamber 90 also communicates through small passages 98 to bleed air over a static discharge rod 100 to neutralize any static electricity that may develop in the tape loops 82 during operation.

A capstan 102 is received within a cylindrical well 103 extending the length of the drive blocks and is adapted to be rotated continuously at speeds commensurate with the desired rate of tape loop feed. The tapes 82, during operation, are drawn against the capstan 102 by withdrawing air from a chamber 104 in communication with vacuum wells 105 through apertures 106. The vacuum wells 105 are established by spacing blocks 107, the capstan 102, and an air bearing, arcuate surface 108 to which air may be delivered from the chamber 90 through apertures 109.

Figure 3:
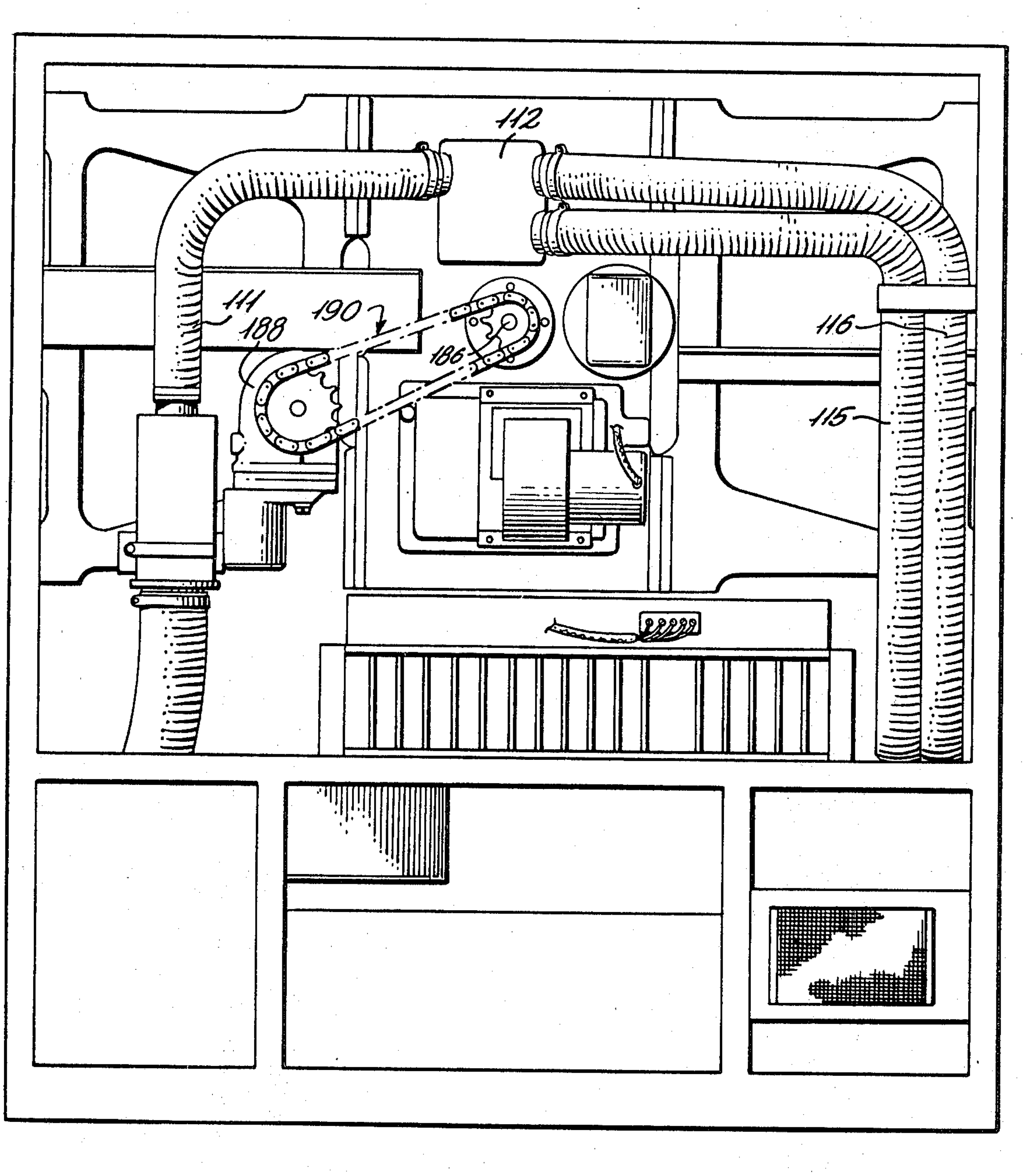
FIG. 3 is a rear elevation of the storage apparatus.
Figures 11, 12:
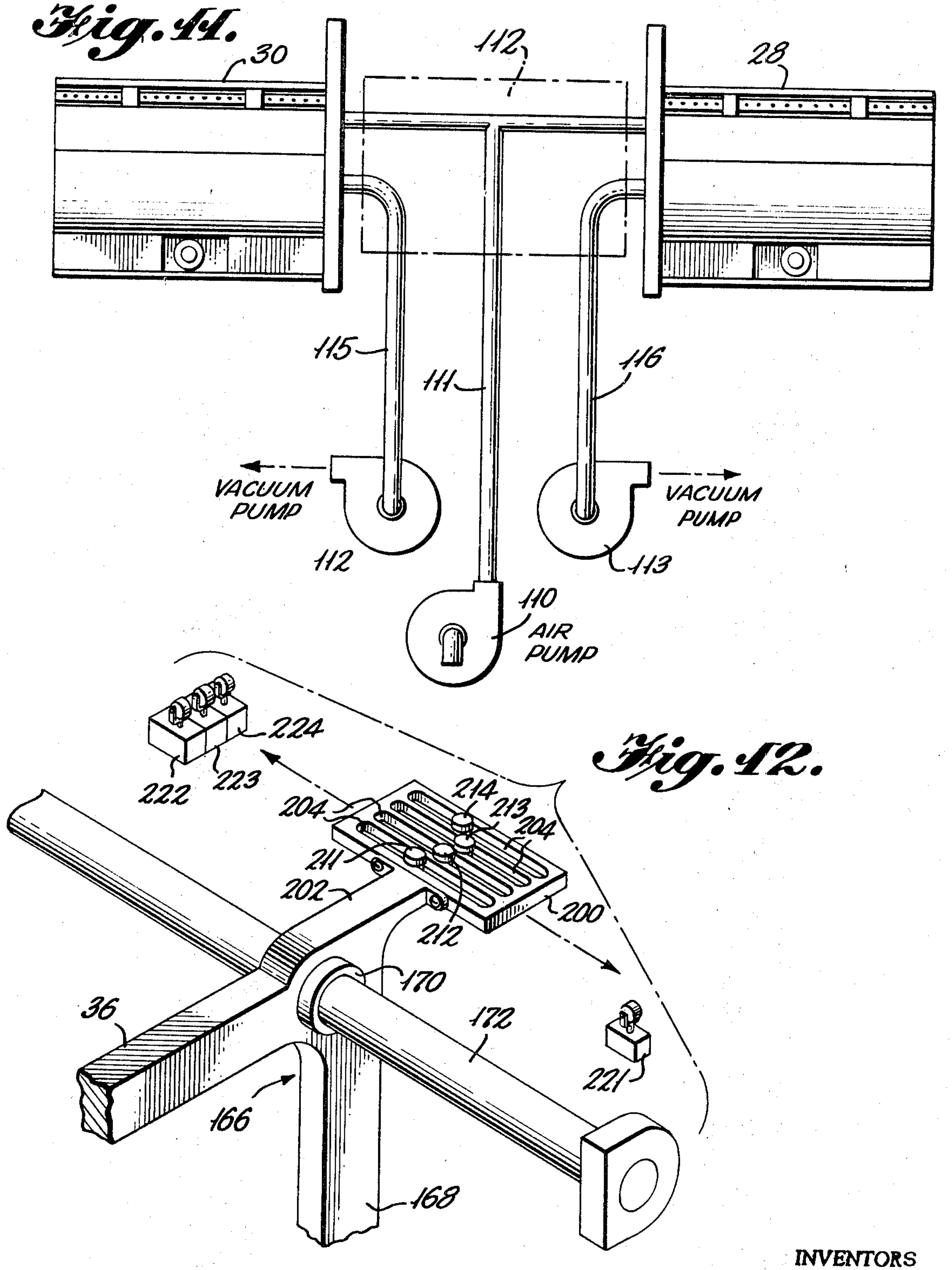
FIG. 11 is a schematic view depicting the manner of supplying air to and withdrawing air from the drive blocks of the system.
FIG. 12 is an enlarged fragmentary view of a portion of the cartridge feed mechanism shown in FIG. 9 illustrating how switches are automatically actuated as the cartridges are moved into position.

As shown in FIGS. 2, 3 and 11, air under pressure is supplied to the chamber 90 and duct 92 in each of the drive blocks 28 and 30 of each transducing bay 12 by an air pump 110, through a duct 111 to a distributor 112. Certain of the hoses 20, connected to the distributor 112, complete the passages for air to be supplied by the pump 110 to the drive blocks 28 and 30. Separate vacuum pumps 113 and 114 are connected through separate ducts 115 and 116, the distributor 112 and certain of the hoses 20 to the chambers 104 in the drive blocks 28 and 30 in each of the transducing bays 12.

To position the tape loops accurately during passage over the head modules 42, a guide trough 118 having a pair of arcuate surfaces 120 is provided in each of the blocks 28 and 30. To assure proper lateral positioning of the tape on the surfaces 120, tape spacing blocks 122 are provided. Because the position assumed by the guide trough 118 during operation would cause the spacers 122 to interfere with the placement of tapes between the drive blocks and the head assembly 40, the guide troughs 118 are retractable. To this end, the guide troughs 118 are supported on a mounting plate 124 in turn carried on a shaft 126 supported in a linear bearing 128. The bearing 128 in turn is secured in an accurately machined bearing block 130 clamped with an appropriately formed well in the drive block. Retraction of the guide trough 118 is effected by a spring 132 acting on a shouldered nut 134 threadably secured at the outer end of the shaft 126. To advance the guide troughs 118 into the operative position as shown in FIG. 4 of the drawings, one or more inflatable bags 136 are positioned in back of the guide trough mounting plate 124 to be supplied with air from a suitable passage such as the duct 92 which also supplies air to the turn-around 74. Hence, it will be appreciated that the cartridges and thus the tapes 82 therein may be moved into position relative to the head assembly 40 and the drive blocks 28 without air being supplied to the chamber 90 or the duct 92 or evacuated from the chamber 104 so that the guide troughs 118 will be retracted by the spring 132. Then, when the passage 92 is pressurized, the air bag 136 inflates to move the guide trough 118 against the bias of spring 132 into its operative position as governed by the base of the nut 134 engaging the end of the linear bearing 128.

Figure 7:
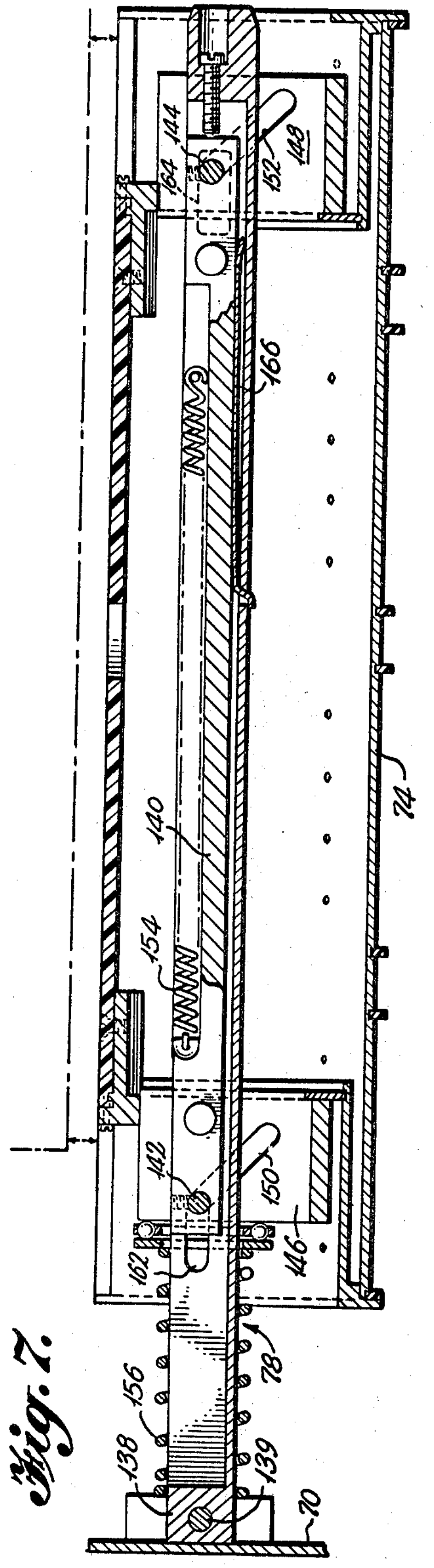
FIG. 7 is a cross section illustrating a tape loop carrier or turn-around employed in the cartridge illustrated in FIGS. 4–6.
Figure 8:
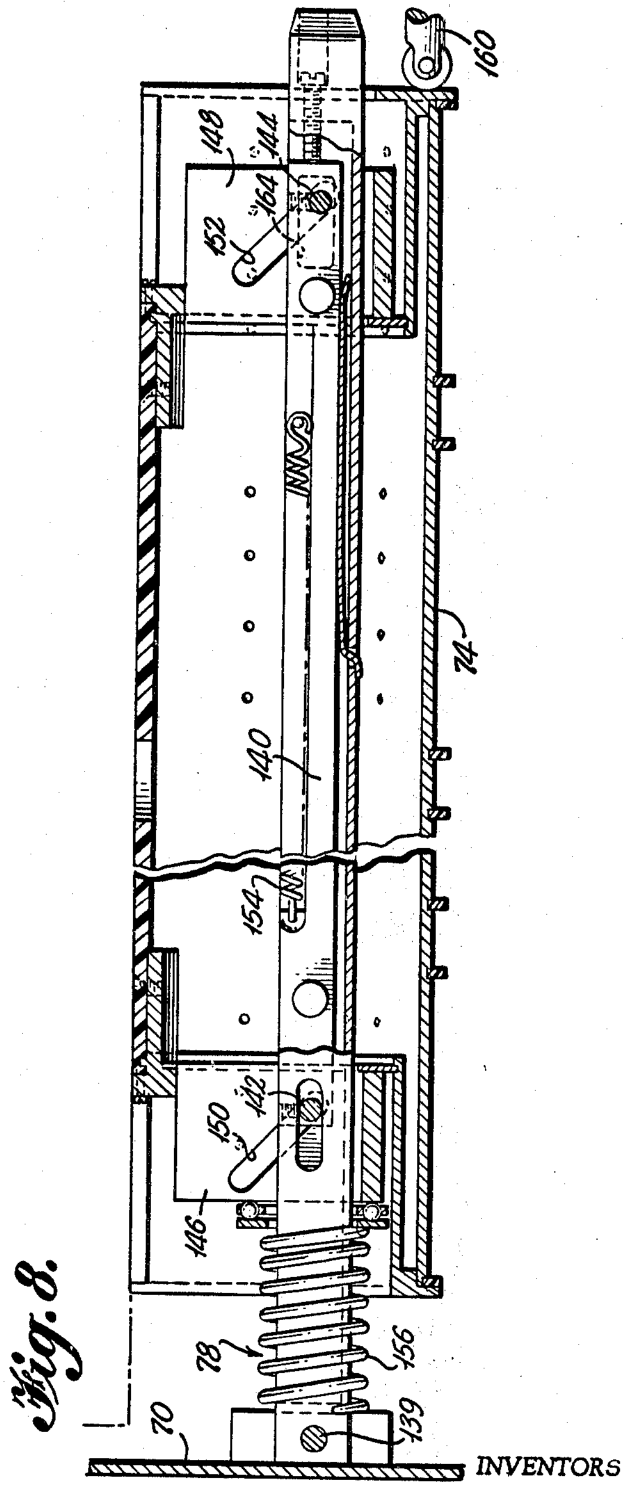
FIG. 8 is a cross section of the turn-around illustrated in FIG. 7 but in a different operative position.

The manner in which the turn-arounds are supported in the cartridges 32 and moved against the upper and lower surfaces of the drive blocks 28 and 30 may be understood by reference to FIGS. 7 and 8 of the drawings. As above mentioned, the turn-arounds 72 and 74 are similarly supported on identical rod assemblies 76 and 78 cantilevered from the rear wall 70 of the cartridge. The rod assembly for each of the turn-arounds includes a channel-shaped mounting bar 138 cantilevered from the rear wall 70 by a mounting pin 139, a tie bar 140 slidably received within the channel-shaped mounting bar and carrying a pair of roller bearing pins 142 and 144, and a pair of cam blocks 146 and 148 having inclined slots 150 and 152 for receiving the ball bearing pins 142 and 144, respectively. The cam blocks 146 and 148 are fixedly secured to the rear and front ends of each turn-around, respectively. The tie bar 140 is connected to the channel-shaped mounting bar 138 by a relatively strong override spring 154. A relatively light return spring 156 biases the turn-around forwardly in the cartridge so that coaction between the inclined cam slots 150 and 152 and the ball bearing pins 142 and 144 operates to cam the lower turn-around 74 downwardly and the upper turn-around 72 upwardly to apply a slight tension to the tape loops trained about the turn-arounds. This condition is maintained at all times during storage of the cartridges.

As shown in FIG. 1 of the drawings, upper and lower pairs of fingers 158 and 160 project from the apron 24 to engage the front end of each turn-around as the cartridge moves into its operative position relative to the drive blocks 28 and 30 and the transducing head assembly 40. Therefore, as the cartridges 32 are fed toward the apron 24, the fingers 158 and 160 engage the front of the upper and lower turn-arounds 72 and 74 to limit further inward movement of the turn-arounds. As the cartridge continues to advance towards the apron, the relatively weak compression spring 156 is compressed and the resulting relative movement between the turn-arounds and the mounting bar assembly causes the turn-arounds to ride vertically toward one another on the ball bearing pins 142 and 144 until they engage the respecive planar surfaces on the drive blocks. In the event more relative horizontal movement occurs between the turn-arounds and the mounting assembly than is necessary to seat the turn-arounds on the drive block surfaces, the override spring 154 permits the tie bar 140 to move relative to the channel-shaped mounting bar 138. Also, it will be noted that the rear pin 142 which is carried by the tie bar 140 rides in slots 162 formed in the walls of the channel-shaped mounting bar 138 and having a width only slightly larger than the diameter of the pin 142. The front or forwardly disposed pin 144 rides in slots 164 having a width significantly greater than the diameter of the pin 144. Also it will be noted that the upper edge of the slots 164 is elevated relative to the upper edge of the slot 162 and that a bow spring 166 biases the tie bar upwardly relative to the front end of the channel bar. Because of this arrangement, the turn-arounds are arranged in a slightly converging position relative to the direction of feed for the purpose of compensating for the force couple that develops as a result of the fingers 158 and 160 being disposed on an axis offset from the axis of the rod assembly 78. The force couple, in other words, corrects the intentional convergence of the turn-arounds as they are moved against the planar surfaces on the top and bottom of the drive blocks.

Figure 9:
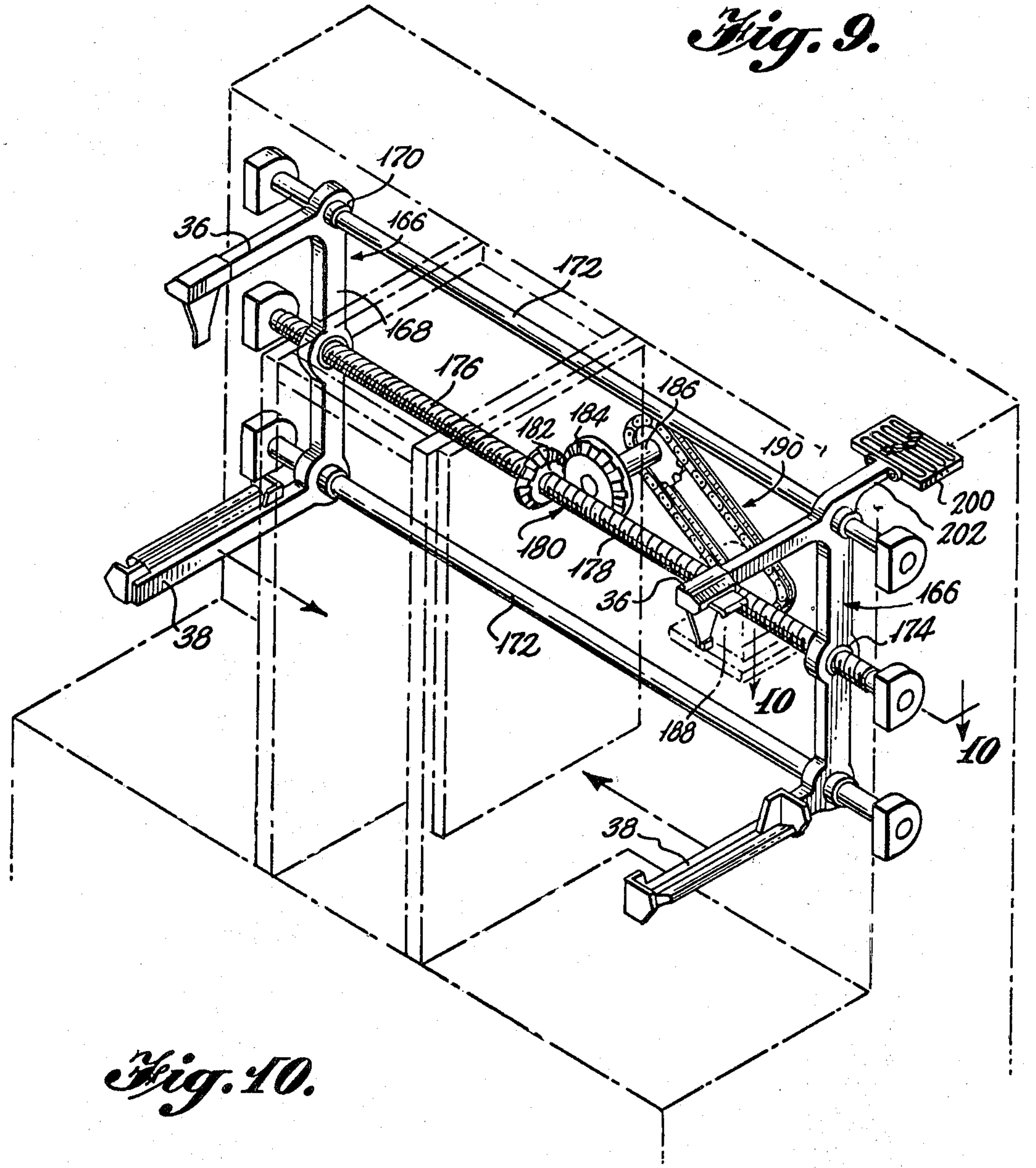
FIG. 9 is a fragmentary perspective view of the cartridge feed mechanism of the apparatus.
Figure 10:
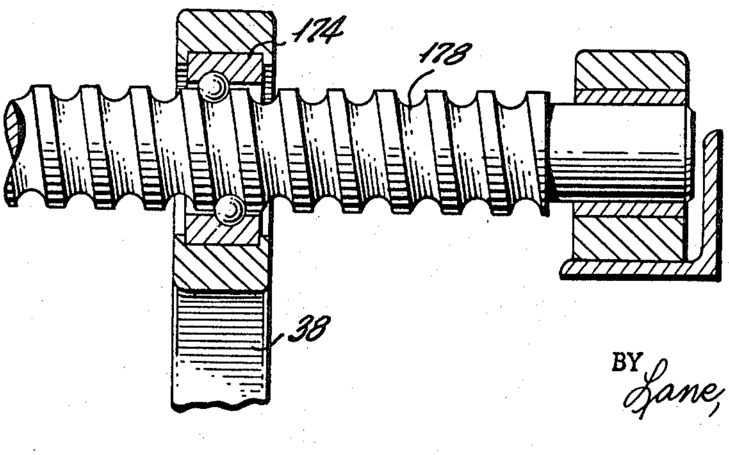
FIG. 10 is an enlarged fragmentary cross section illustrating the details of the cartridge feed screw illustrated in FIG. 9.

As shown in FIGS. 9 and 10, the upper and lower cartridge supporting arms 36 and 38 in each bay 12 form part of a generally U-shaped cartridge carrier 166 having a vertical base portion 168. The upper and lower ends of the base portion of each carrier are provided with linear bearings 170, in turn received on parallel horizontal rods 172 fixed in the chassis 10. The central portion of each of the base portions 168 receives a ball bearing nut member 172 (FIG. 10) for engaging oppositely pitched threads 176 and 178 on a feed screw 180. A bevel gear 182 is keyed to the feed screw 180 at the center thereof, or between the oppositely pitched threads 176 and 178, and engages a further bevel gear 184 mounted on a drive shaft 186 to be driven by an electric motor 188 through a chain and sprocket assembly 190.

As best shown in FIG. 12, a slotted switch actuator plate 200 is mounted on an arm 202, which extends rearwardly from one of the U-shaped carriers 166, at the bearing 170. Four slots 204 are formed in the plate 200 extending parallel to the direction of travel of the carrier 166. Adjustably mounted in the slots 204 are four adjustable switch actuating pins 211 through 214 which extend down beneath the plate 200. The pin 211 is positioned in its slot 204 so that it will actuate a limit switch 221, when the carriers 166 are in their fully extended positions, at which the cartridges can be interchanged. Accordingly, the limit switch 221 is referred to as the "cartridge out switch." The actuating pin 212 is positioned to actuate and close a limit switch 222 when the carriers 166 have moved to their fully retracted or innermost positions and brought the cartridges into position for transducing operations. Accordingly, the limit switch 222 is referred to as the "cartridge in switch." The actuating pins 213 and 214 are positioned in the slots 204 to actuate and close limit switches 223 and 224, respectively, as the carriers 166 near their fully retracted positions. The pins 213 and 214 are positioned so that first the switch 224 is actuated and then the switch 223 is actuated as the carriers 166 are moving the cartridges into transducing position.

Figure 13:
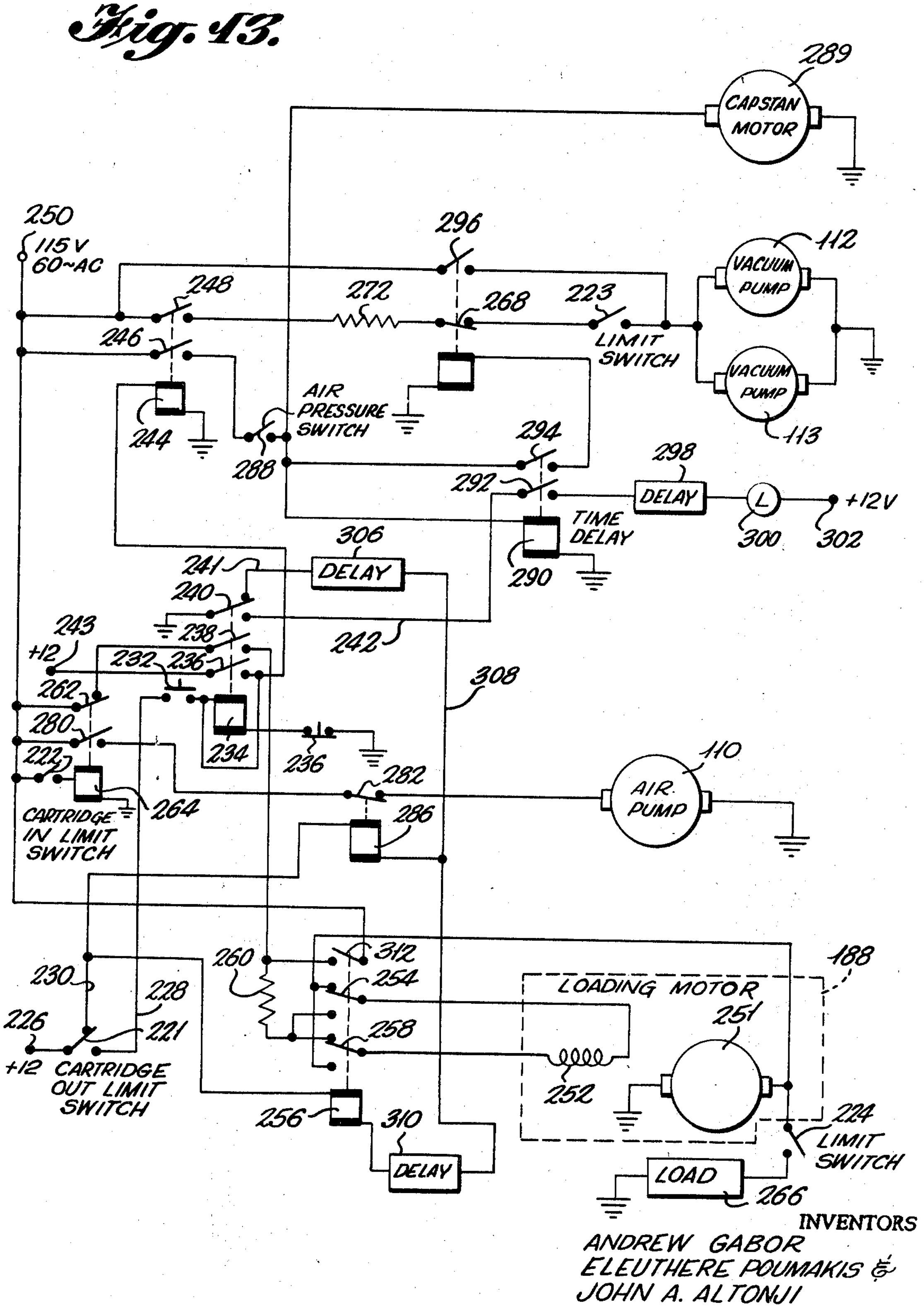
FIG. 13 is a diagram of the circuit which provides the desired automatic loading sequence.

As shown in FIG. 13, the contacts of the switch 221 normally connect a source of plus 12 volts applied at a terminal 226 to a lead 230 when not actuated and connect the plus 12 volts to a lead 228 when actuated. Thus when the carries 166 are in their fully extended positions, at which the cartridges can be interchanged, plus 12 volts will be applied to lead 228 and at all other times plus 12 volts will be applied to a lead 230. When the cartridges have been loaded on the carriers 166 and it is desired for the cartridges to be retracted into position for transducing operations, a normally open pushbutton switch 232, referred to as the "load switch," is momentarily closed. Since the carriers 166 will at this time by fully extended, plus 12 volts will be applied on lead 228. Accordingly, the closure of load switch 232 will energize a relay 234 through a circuit including a normally closed push-button switch 236, which is referred to as the "unload switch." Upon being energized, the relay 234 will close its contacts 236 and 238 and will move its contacts 240 to connect a lead 241 to ground and disconnect ground from the lead 242. The closure of the contacts 236 provides a holding circuit to maintain the relay 234 energized from a source of plus 12 volts applied at a terminal 243 after the push-button switch 232 is released.

The closure of the load switch 232 also causes energization of a relay 244, which is also maintained energized by closure of the contacts 236 of the relay 234 after the push-button switch 232 is released. Upon being energized, the relay 244 will close its contacts 246 and 248.

The closure of the contacts 238 of the relay 234 connects power from a 115-volt, 60-cycle AC source applied at a terminal 250 to the loading motor 188. The loading motor 188 is energized with its armature in series with its field winding. The armature of the motor is designated by the reference number 251 and the field winding is designated by the reference number 252. The motor 188 is energized by a circuit comprising contacts 254 and 258 of a relay 256, a resistor 260, contacts 238 of the energized relay 234 and normally closed contacts 262 of a relay 264. With the motor 188 energized in this manner, it will drive the feed screw in a direction to retract the carriers 166 and bring the cartridges into their transducing positions. As soon as the carriers 166 move from their fully extended positions, the contacts of the switch 221 will disconnect the 12 volts from the lead 228 and connect it to the lead 230.

As the cartridges near their transducing positions, the actuating pin 214 will close the limit switch 224 shunting an impedance 266 across the armature of the motor 188 so as to slow the speed of the motor. Thus the approach of the cartridges is automatically slowed as they near their transducing positions. Next, the actuating pin 213 closes the limit switch 223, which will cause the vacuum pumps 112 and 113 to be energized at low speed to thus apply low suction to the vacuum wells 105. The low suction applied to the vacuum wells puts the tape loops under low tension and takes up the slack in the tape loops as the turn-arounds 72 and 74 begin to move vertically as the cartridges approach their transducing positions. The actuating pin 213 is positioned to close the switch 223 so as to apply the low suction to the vacuum wells just as the turn-arounds begin their vertical movement to their seated positions. The vacuum pumps 112 and 113 are energized from the 60-cycle source at terminal 250 through a circuit comprising the limit switch 223, normally closed contacts 268 of a relay 270, a resistor 272, and the normally open contacts 248 of the relay 244, which was energized as described above on the closure of the load switch 232. The vacuum pumps 112 and 113 are operated at low speed because they are energized through the resistor 272.

When the carriers 166 have brought the cartridges into position for transducing operations, the limit switch 222 will be closed so as to energize the relay 264 from the 60-cycle source at terminal 250. Accordingly, the normally closed contacts 262 will be opened to deenergize the loading motor 188. Thus movement of the carriers 166 ceases when the cartridges get into position. The energization of the relay 264 also causes it to close its normally open contacts 280. Closure of the contacts 280 causes the air pump 110 to be energized from the 60-cycle AC source applied at terminal 250. The energization circuit of the air pump 110 is over normally closed contacts 282 of a relay 286. The air pump as described above supplies air to the air bearings of the turn-arounds and drive blocks and also to the inflatable bags 136 which advance the guide troughs 118 into operative position.

An air pressure switch 288 is located in the duct 111 and when this pressure builds up to the desired value, the switch 188 will close. When the switch 188 closes, the air bearings in the turn-arounds and in the drive block will be fully pressurized and the bags 136 will be fully inflated so that the guide troughs 118 are in their operative positions. When the air pressure switch 288 closes, it completes a circuit to energize the capstan motor 289, which drives the capstans 102. The capstan motor 289 is energized from the 60-cycle AC source applied at terminal 250 over a circuit which includes the normally open contacts 246 of the relay 244, which has been maintained energized since the closure of the load switch 232.

The closure of the air pressure switch 288 also causes the energization of a time relay 290 from the 60-cycle source applied at terminal 250 over the normally open contacts 246. After a two-second delay the relay 290 will close its normally open contacts 292 and 294. The closure of the contacts 294 causes the relay 270 to be energized from the 60-cycle source at terminal 250 over the normally open contacts 246 and the air pressure switch 288. When the relay 270 is energized, it opens its normally closed contacts 268 and closes its normally open contacts 296. The contacts 296 shunt the resistor 272 and cause full power to be applied to the vacuum pumps 112 and 113 so that the vacuum pumps are energized to operate at full speed and apply full suction to the vacuum wells 105. As a result, the tape loops will be drawn tightly against the capstan 102 which will then drive the tape loops over the now fully pressurized air bearings and through the now fully advanced trough guides 118.

The closure of the contacts 292 connects a delay circuit 298 to the lead 242 which is connected to ground by the contacts 240 of the energized relay 234, as has been described above. The delay circuit 298 operates to extend the ground to one side of a signal lamp 300 after a delay of 5 seconds. The other side of the lamp 300 is connected to a source of plus 12 volts applied at a terminal 302. Accordingly, after a delay of five seconds, the lamp 300 will be energized to indicate to the operator that the system is ready for transducing operations.

To unload the cartridges, the normally closed pushbutton switch 236 is actuated to momentarily open its contacts. This action will deenergize the relay 234 so that its contacts 236 and 238 open and contacts 240 connect ground to the lead 241 instead of 242. The opening of the contacts 236 deenergizes the relay 244, which thereupon opens its contacts 246 and 248. The opening of the contacts 246 deenergizes the capstan motor 289 so that the capstan 102 stops rotating. The opening of the contacts 246 also deenergizes the relay 290 which thereupon opens its contacts 292 and 294. The opening of the contacts 294 deenergizes the relay 270, which thereupon closes its contacts 268 and opens its contacts 296. As a result, the vacuum pumps 112 and 113 are deenergized. The closure of the contacts 268 will not maintain the vacuum pumps 112 and 113 energized at low speed because the contacts 248 will be open.

The disconnecting of ground from the lead 242 by the contacts 240 upon the deenergization of relay 234 will extinguish the signal lamp 300. It also initiates operation of a two-second delay circuit 306 connected to the lead 241. After a delay of two seconds, the delay circuit 306 extends ground on lead 241 to a lead 308. As a result, the relay 286 will be energized from the 12 volts applied at terminal 226 over the cartridge out limit switch 221, which at this time will connect the 12 volts to the lead 230. The energization of the relay 286 will cause its contacts 282 to open, deenergizing the air pump 110. The deenergization of the air pump 110 will remove the air pressure from the air bearings and also deflate the bags 136 so that the trough guides 118 retract. The air pressure switch 288 will close but this closure will have no effect as the contacts 246 of the relay 244 will be open. With the trough guides out of the way and the air bearings no longer pressurized, the system is now ready to move the cartridges out from their transducing positions.

The extension of the ground to lead 308 by the delay 306 initiates the operation of a ten-second delay 310. At the end of the ten-second delay, provided by the delay circuit 310, the ground on lead 308 will be extended to the relay 256, which thereupon will be energized from the 12 volts applied at terminal 226 over the contacts 221 of the cartridge out limit switch. When the relay 256 is energized, it closes a set of normally open contacts 312 and changes the position of the contacts 254 and 258 so that they now connect the field winding 252 in series with the armature 251 of the loading motor 188 in the opposite direction. The field winding 252 and the armature 251 will now be energized from the 60-cycle source applied at terminal 250 over the contacts 312 through the resistor 260, and over the contacts 254 and contacts 258. Since the field winding is reversed, the motor 188 will rotate in the opposite direction and will move the cartridges out from their transducing positions. Since the switch 224 will be closed by the actuating pin 214, the armature 251 will be shunted by the load 266 and the motor 188 will initially operate at low speed. As the motor 188 begins to move the cartridges, the switch 222 will open, causing the relay 264 to be deenergized. As a result, the contacts 280 of the relay 264 will open and the contacts 262 of the relay 264 will close. Next, as the loading motor 188 retracts the cartridges, the switch 223 will open and then the switch 224 will open. When the switch 224 opens, the motor will be fully energized and will operate at full speed. When the cartridges are fully extended to their outermost positions, at which the cartridges are interchangeable, the contacts 221 will disconnect the 12 volts applied at terminal 226 from lead 230 and apply it again to lead 228. As a result, the relays 256 and 286 will be deenergized. The deenergization of the relay 256 will cause the contacts 254 and 258 to change positions and the contacts 312 to open. The opening of the contacts 312 will deenergize the loading motor 188 to stop the cartridges at their fully extended positions, where the cartridges are interchangeable. The deenergization of the relay 286 will cause closure of the contacts 282 but since the contacts 280 will be open, the air pump 110 will remain deenergized. The circuit will now be ready for moving the cartridges back into their transducing position upon actuation of the loading switch 232.

Thus, the system of the present invention provides an automatic cartridge loading and unloading system in which first the speed of approach of the cartridges to their transducing positions is automatically reduced to a low speed, then while the cartridges are still moving into position, suction is applied to the vacuum wells 105 to take up the slack in the tape loops caused by the vertical movement of the turn-arounds. Then, as soon as the cartridges get into their transducing positions, the movement of the cartridges is automatically stopped and air pressure is automatically supplied to the air bearings and the guide troughs 120 are automatically extended into position. When the air pressure reaches the desired value, at which time the air bearings will be fully pressurized and the guide troughs will be fully extended, the capstan will be energized. Then following another delay, full suction will be applied to the vacuum wells so that the tapes are drawn tightly against the capstan. After another delay, to allow the tape loops to reach full speed, signal lamp 300 is energized to indicate that the system is ready for transducing operations.

In the unloading of the cartridges, the loading motor is energized in the reverse direction to automatically bring the cartridges out to their fully extended positions, at which time the loading motor 188 is deenergized automatically. Also, the capstan motor 289, the vacuum pumps and the air pumps are automatically deenergized during the retraction operation. The system will then be ready to again bring cartridges into the transducing positions upon closure of the switch 232.

The above description is of a preferred embodiment of the invention and many modifications may be made thereto without departing from the spirit and scope of the invention, which is defined in the appended claims.

What is claimed is:

1. A magnetic storage system comprising a cartridge containing magnetic storage tape; means for moving said cartridge between a first position, at which said cartridge is removable, and a second position; transducing means for performing transducing operations on said magnetic tape; means defining air bearings for said magnetic tape, position sensing means to sense when said cartridge reaches said second position and to provide an indication thereof; means responsive to said indication provided by said position sensing means to apply air pressure to said air bearings to activate said air bearings automatically when said cartridge is moved to said second position; pressure sensing means to sense when the air pressure applied to said air bearings reaches a predetermined value sufficient to float said tape over said air bearings, and means responsive to said indication provided by said pressure sensing means to drive said magnetic tape over said air bearings past said transducing means in transducing relationship therewith when said air pressure reaches said predetermined value.

2. A magnetic storage system as recited in claim 1 wherein there is provided normally retracted guide means operable when extended to guide magnetic tape past said transducing means, pneumatic means operable when pressurized to extend said guide means, said means for applying air pressure to said air bearings also operating to automatically pressurize said pneumatic means when said cartridge is moved to said second position.

3. A magnetic storage system as recited in claim 1 wherein there is provided means to automatically slow the approach of said cartridge to said second position when said cartridge nears said second position in moving from said first position to said second position.

4. A magnetic storage system comprising a cartridge containing at least one endless belt of magnetic storage tape, said cartridge containing turn-arounds for supporting said endless belt; means for moving said cartridge between a first position, at which said cartridge is removable, and a second position; means for seating said turn-arounds at said second position to positively locate said turn-arounds at said second position; means to move said turn-arounds toward each other as said cartridge nears said second position to position said turn-arounds on said seating means, position sensing means to detect when said cartridge nears said second position as said cartridge is moving from said first position to said second position and to provide an indication thereof, means responsive to said indication provided by said position sensing means to apply a low suction to said endless belt when said cartridge nears said second position to take up the slack in said endless belt caused by the movement of said turn-arounds toward each other, and transducing means for performing transducing operations on said endless belt when said cartridge is in said second position.

5. A magnetic storage system as recited in claim 4 wherein there is provided a capstan for driving said magnetic tape past said transducing means, second position sensing means to detect when said cartridge has reached said second position and to provide an indication thereof and means responsive to said indication provided by said second position sensing means to increase the suction applied to said tape to draw it against said capstan to be driven thereby when said cartridge has moved into said second position.

6. A magnetic storage system as recited in claim 4 wherein there is provided means to automatically slow the approach of said cartridge to said second position when said cartridge nears said second position in moving from said first position to said second position.

7. A magnetic storage system as recited in claim 4 wherein there is provided means defining air bearings for said magnetic tape, means to apply air pressure to said air bearings to activate said air bearings automatically when said cartridge is moved to said second position, pressure sensing means to detect when the air pressure applied to said air bearings reaches a predetermined value sufficient to float said tape over said air bearings and to provide an indication thereof and means responsive to said indication provided by said pressure sensing means to drive said endless belt over said air bearings past said transducing means in transducing relationship therewith when said air pressure reaches said predetermined value.

8. A magnetic storage system as recited in claim 7 wherein there is provided normally retracted guide means operable when extended to guide said endless belt past said transducing means, pneumatic means operable when pressurized to extend said guide means, said means for applying air pressure to said air bearings also operating to automatically pressurize said pneumatic means when said cartridge is moved to said second position.

References Cited

UNITED STATES PATENTS 3,315,861 4/1967 Metzger ---------- 340—174.1

BERNARD KONICK, Primary Examiner

J. ROSENBLATT, Assistant Examiner

U.S. Cl. X.R.

179—100.2